United States Patent
Pantelleria

(10) Patent No.: US 10,625,480 B2
(45) Date of Patent: Apr. 21, 2020

(54) PERFORATED TOP CURL FOR PLASTIC CONTAINER

(71) Applicant: Huhtamaki, Inc., De Soto, KS (US)

(72) Inventor: Joseph A. Pantelleria, Overland Park, KS (US)

(73) Assignee: HUHTAMAKI, INC., De Soto, KS (US)

( * ) Notice: Subject to any disclaimer, the term of this patent is extended or adjusted under 35 U.S.C. 154(b) by 737 days.

(21) Appl. No.: 15/187,205

(22) Filed: Jun. 20, 2016

(65) Prior Publication Data
US 2016/0303811 A1 Oct. 20, 2016

Related U.S. Application Data

(62) Division of application No. 14/341,315, filed on Jul. 25, 2014, now Pat. No. 9,394,074.

(Continued)

(51) Int. Cl.
| | |
|---|---|
| B29C 57/12 | (2006.01) |
| B65D 1/26 | (2006.01) |
| B29D 22/00 | (2006.01) |
| B65D 1/46 | (2006.01) |
| B65D 43/02 | (2006.01) |
| B31B 50/74 | (2017.01) |
| B29C 53/40 | (2006.01) |
| B29K 101/00 | (2006.01) |
| B29L 31/00 | (2006.01) |

(Continued)

(52) U.S. Cl.
CPC ............ *B29D 22/003* (2013.01); *B29C 53/40* (2013.01); *B29C 57/12* (2013.01); *B31B 50/74* (2017.08); *B65D 1/265* (2013.01); *B65D 1/46* (2013.01); *B65D 43/0212* (2013.01); *B29C 53/38* (2013.01); *B29C 2793/0045* (2013.01); *B29K 2101/00* (2013.01); *B29L 2031/7154* (2013.01); *B31B 50/14* (2017.08); *B31B 50/81* (2017.08); *B31B 2100/00* (2017.08); *B31B 2110/20* (2017.08); *B31B 2120/002* (2017.08); *Y10T 156/1038* (2015.01)

(58) Field of Classification Search
CPC ........ B65D 1/265; B65D 1/46; B29D 22/003; B29C 57/12; B29C 53/38; B29C 2793/0045
USPC .......................................................... 229/4.5
See application file for complete search history.

(56) References Cited

U.S. PATENT DOCUMENTS

| | | |
|---|---|---|
| 1,713,720 A | 5/1929 | Simmons |
| 1,887,688 A | 11/1932 | Koch et al. |

(Continued)

*Primary Examiner* — Gloria R Weeks
(74) *Attorney, Agent, or Firm* — Husch Blackwell LLP

(57) ABSTRACT

A plastic container is provided having a sidewall, a downwardly extending upper lip, and a perforated line defined at a top edge of the container where the lip and sidewall are joined. The sidewall and lip may be formed from a container body constructed of a single sheet of material that is wrapped such that marginal edge portions of the blank are brought together in overlapping fashion to form a side seam. When the sidewall and lip are formed from such a blank of material, the perforated line is formed a specified distance below a top edge of such blank. The perforated line reduces the amount of force, heat and lubricant required in order to form (e.g., curl, roll, fold or bend) the upper lip of the container. The slits of the perforated line may extend across a width of the blank in either a uniform or variable fashion.

13 Claims, 7 Drawing Sheets

Related U.S. Application Data

(60) Provisional application No. 61/859,449, filed on Jul. 29, 2013.

(51) Int. Cl.
*B29C 53/38* (2006.01)
*B31B 50/14* (2017.01)
*B31B 100/00* (2017.01)
*B31B 110/20* (2017.01)
*B31B 120/00* (2017.01)
*B31B 50/81* (2017.01)

(56) References Cited

U.S. PATENT DOCUMENTS

| | | |
|---|---|---|
| 1,916,519 A | 7/1933 | Madsen et al. |
| 1,969,030 A | 8/1934 | Page |
| 2,053,678 A | 9/1936 | Page |
| 2,200,111 A | 5/1940 | Bensel |
| 2,888,184 A | 5/1959 | Hendry |
| 3,229,887 A | 1/1966 | Fehres et al. |
| 3,583,624 A | 6/1971 | Peacock |
| 3,924,795 A | 12/1975 | Smith |
| 7,121,991 B2 * | 10/2006 | Mannlein ............... B31F 1/0038 493/109 |
| 7,311,243 B1 | 12/2007 | Konzal |
| 7,578,412 B2 * | 8/2009 | Clamage ............ B65D 25/2897 215/384 |
| 7,694,837 B2 | 4/2010 | Robertson et al. |
| 9,394,074 B2 * | 7/2016 | Pantelleria .............. B29C 57/12 |
| 9,926,098 B2 * | 3/2018 | Fike ....................... B65D 1/265 |
| 2006/0289609 A1 | 12/2006 | Fritz et al. |
| 2007/0051790 A1 | 3/2007 | Smith et al. |
| 2012/0043374 A1 | 2/2012 | Lemon |

* cited by examiner

PERFORATED TOP CURL FOR PLASTIC CONTAINER

CROSS-REFERENCE TO RELATED APPLICATIONS

This Application is a Divisional of and claims priority to U.S. application Ser. No. 14/341,315, filed on Jul. 25, 2014 to Joseph A. Pantelleria entitled "Perforated Top Curl for Plastic Container," which claims priority to U.S. Provisional Patent Application Ser. No. 61/859,449, filed on Jul. 29, 2013, to Joseph A. Pantelleria entitled "Perforated Top Curl for Plastic Can". The entire disclosures of the above-identified applications are incorporated herein by reference.

BACKGROUND OF THE INVENTION

Plastic containers having sidewalls with outwardly curled upper rims or lips are well known in the art. During the formation of the upper lip, a significant amount of heat is typically applied adjacent the lip region in order to soften the plastic sidewall material, thereby reducing the amount of force required for curling the lip. However, residual heat remaining in the sidewall after the formation of the lip makes the sidewall difficult to handle for an extended period of time.

Additionally, due to the amount of force required to form the lip, a lubricant, such as mineral oil, is often used for lubricating the interface between the sidewall and a die during the lip curling process. However, excess lubricant can often remain coated on the sidewall, which is undesirable for consumers handling the container.

Further, in cases where the sidewall is constructed of a flat sheet of plastic material that is wrapped to form a cylinder, an overlapping side seam is formed. The overlapping side seam results in a thickened region in the lip that is relatively stiff and requires an increased amount of force during the curling process, as compared to the remainder of the lip. The increased amount of force required in this concentrated region affects the uniformity of the forming process, especially when a die is used to form the lip.

Furthermore, prior art methods and structures often result in a misshapen upper portion of the container. Due to various factors, such as the forces required to form the lip, the stiffness created by the side seam and the memory instilled in the plastic material, the resultant cross-sectional shape of the upper portion of the container is often unpredictable. For example, an oval-shaped cross section may result when a circular-shaped cross section is actually desired.

Accordingly, a need exists for a plastic container having an upper lip that may be formed through a reduced amount of force, heat and lubricant. A need also exists for a blank of plastic-material that can be formed into such a plastic container. A further need exists for method of manufacturing such a plastic container.

SUMMARY OF THE INVENTION

One embodiment of the present invention is directed to a plastic container comprising a bottom wall, a plastic circumferential sidewall extending upwardly from the bottom wall, a downwardly extending plastic lip that circumscribes an upper portion of the sidewall, and a perforated line defined at a top mouth edge of the container where the lip and sidewall meet. The sidewall and lip portions of the container can be formed from a single blank of plastic material. In one embodiment, the blank is wrapped such that marginal edge portions of the blank are brought together in overlapping fashion to form a side seam.

The perforated line includes uncut portions of material between the slits. The slits and uncut portions may be of uniform widths and may each be between about 0.016" and about 0.25" wide. In other embodiments, the slits are wider than the uncut portions in regions adjacent side edges of the blank. The lip may extend either outwardly or inwardly into the container. The lip can have a downwardly extending length of between about 0.15" and about 0.5". Due to the overlapping portions of the blank at the side seam, the sidewall and lip are each of a double wall thickness in a region of side seam.

As mentioned above, the container body can be constructed from a single blank of plastic material. The blank includes a sidewall portion, a lip portion located above the sidewall portion, and a perforated line located between the sidewall portion and the lip portion. The perforated line may be as described above and includes a plurality of slits defined in the blank and uncut portions of material between the slits. The perforated line may be located between about 0.15" and about 0.5" below a top edge of the blank.

The present invention is also directed to a method of manufacturing a container comprising the steps of providing a plastic container body having top and bottom edges, forming a perforated line having slits at a specified distance below the container body top edge, and curling, rolling, folding or bending a top portion of the container body outwardly and downwardly to form a lip that circumscribes a top portion of the container body. The method may also include the steps of providing a blank of material having opposing marginal side edge portions and wrapping the blank such that the marginal edge portions are brought together in overlapping fashion to form a side seam. The step of forming the perforated line can be undertaken prior to the blank being wrapped. When the lip is formed, the top edge of the container body becomes the lower edge of the lip. The slits of the perforated line are defined proximate an upwardly opening mouth of the container in a region when the lip and sidewall meet.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts hi the various views.

DETAILED DESCRIPTION OF THE INVENTION

Figure 1:
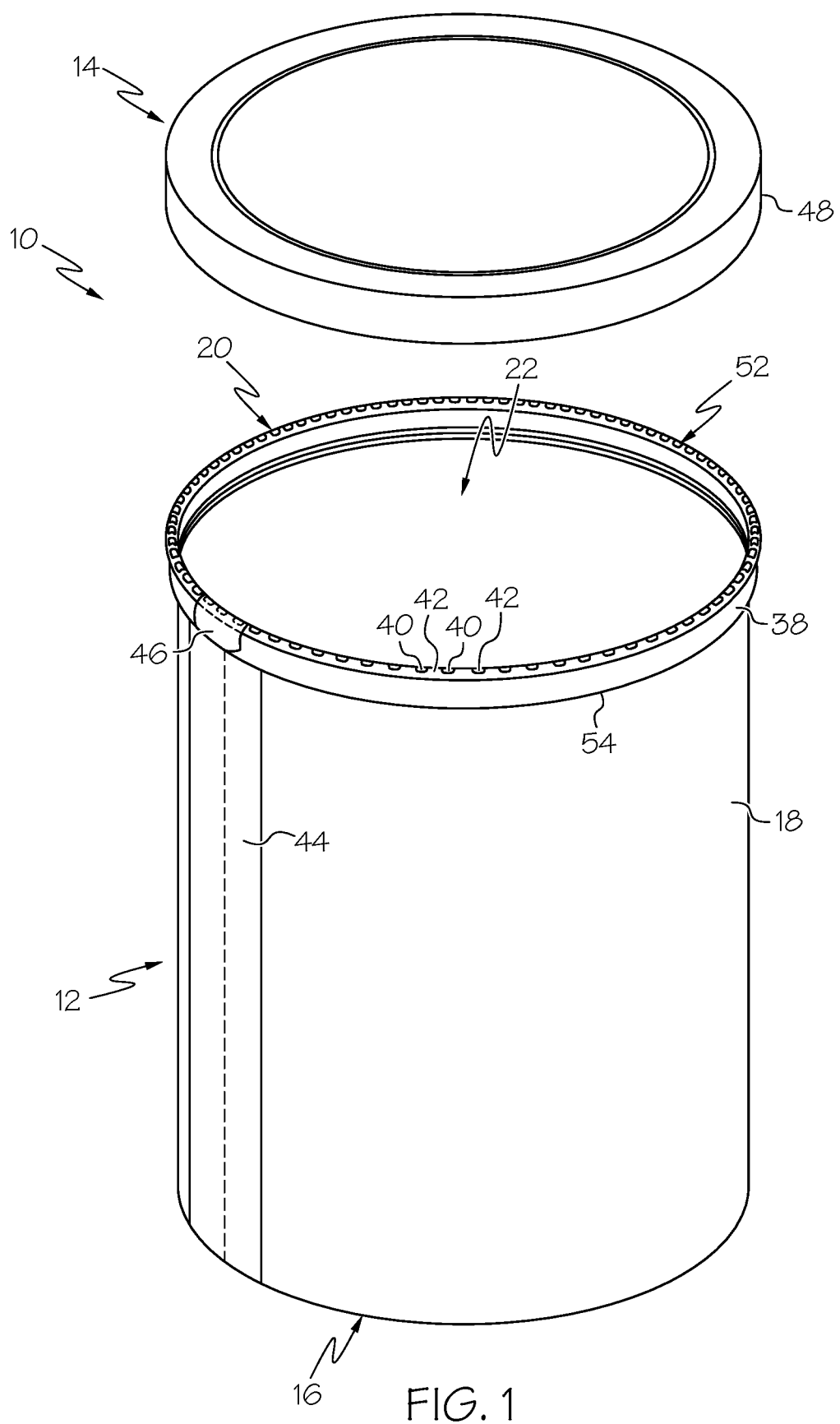
FIG. 1 is an exploded side perspective view of a plastic container and lid assembly in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. Any dimensions included in the drawings are presented by way of example only and are not intended to limit the concepts and principles of the present invention. Embodiments having dimensions different from than those shown in the drawings are well within the scope of this invention and, in fact, the invention is directed to multiple embodiments of various sizes.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2:
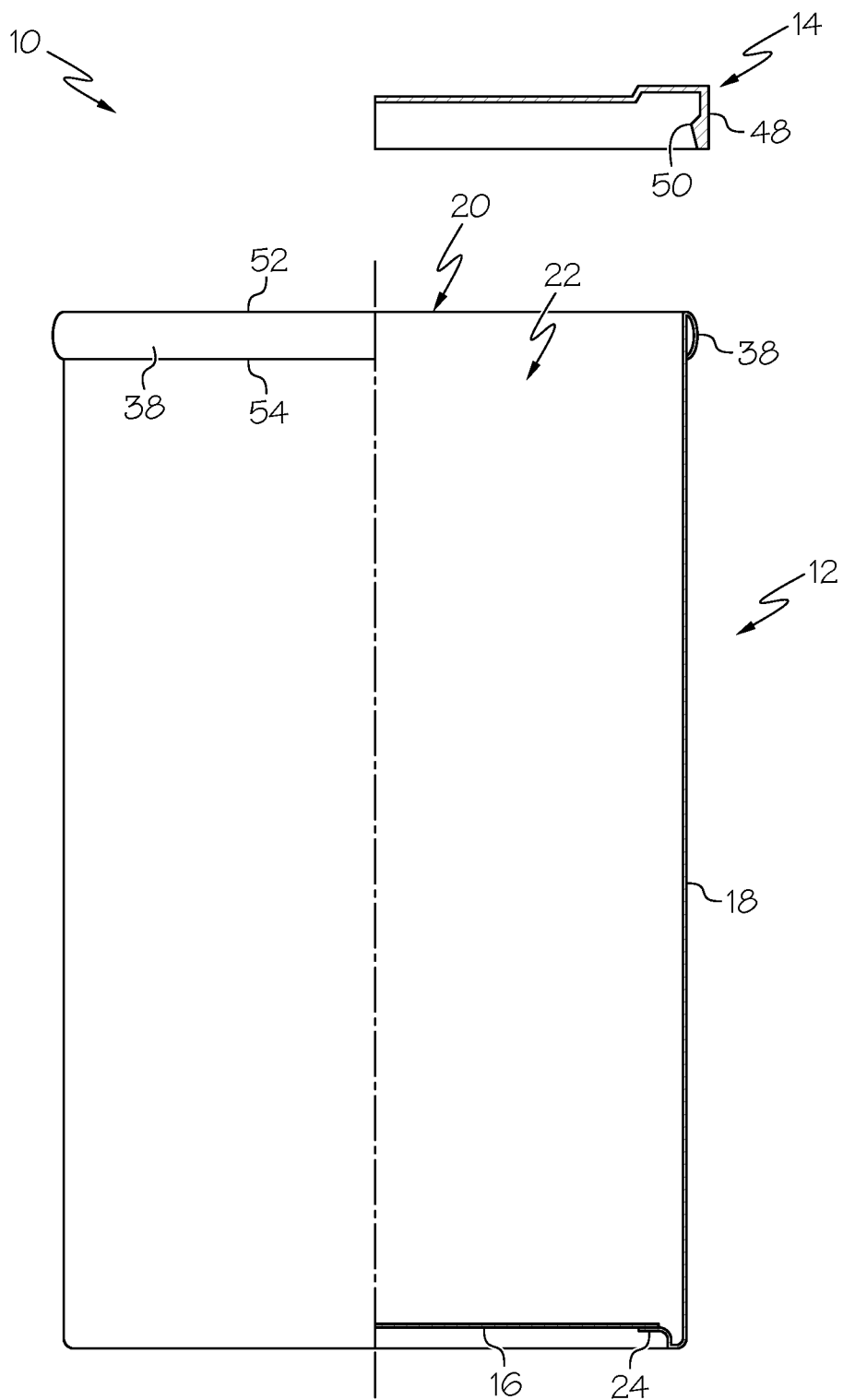
FIG. 2 is a partial section view of the plastic container and lid assembly of FIG. 1.

Referring to the figures, one embodiment of the present invention is directed to a container/lid assembly 10 that includes a container 12 and lid 14, as illustrated in FIG. 1. The container 12 is constructed of a bottom wall panel 16 and an upwardly extending circumferential sidewall 18. In one embodiment, the sidewall 18 has a generally circular cross section. However, it will be understood that other, non-circular cross-sectional shapes can be utilized. Opposite the bottom wall panel 16, the sidewall 18 terminates in an upwardly opening mouth 20 providing access to a chamber 22 adapted for storing ingestibles, such as food and drink, or other non-ingestible items. As discussed in greater detail below, the mouth 20 includes an inwardly or outwardly curled, rolled, folded or bent rim or lip 38 for providing structural support and stability to the top end of the container 12, maintaining the desired shape of the top end of the container 12 and facilitating securement of the lid 14 to the mouth 20. The lid 14 may be provided with a skirt 48 having an internally projecting rib 50 adapted for locking over the lip 38, is shown in FIG. 2.

The sidewall 18, lip 38 and bottom wall panel 16 can be constructed from thermoplastic or plastic materials, such as polypropylene or polyethylene, or can be constructed of other suitable materials having similar mechanical properties, such as being lightweight and pliable. In one embodiment, the sidewall 18 includes an inwardly folded bottom edge portion 24 on which the bottom wall panel 16 is supported. The bottom wall panel 16 may be adhesively-sealed or heat-sealed to the sidewall 18 through the application of heat and pressure or by adhesive, sonic weld, ultrasonic weld, sealants or the like.

Figure 5:
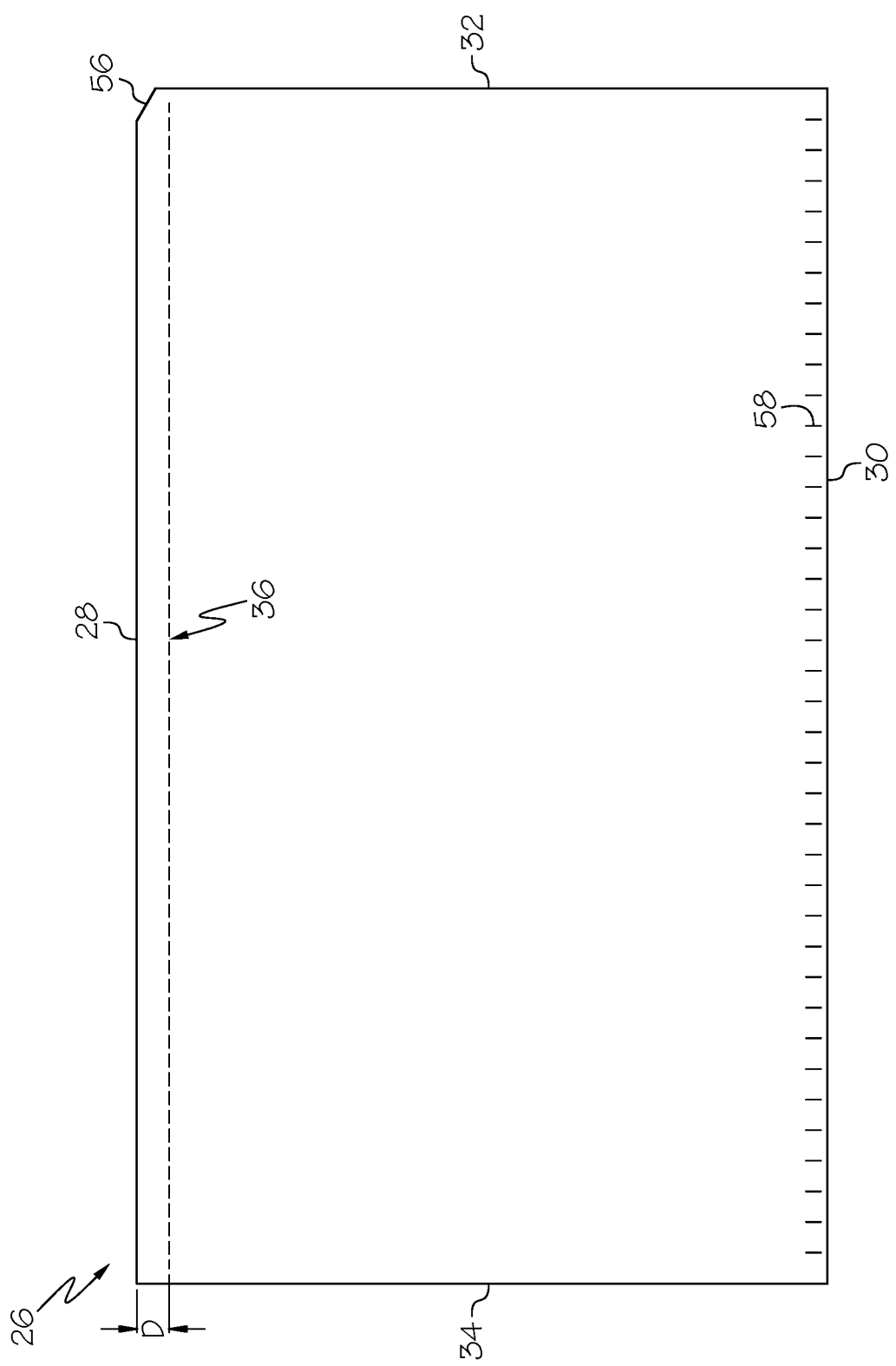
FIG. 5 is a plan view of a blank used to form the sidewall and upper lip of a plastic container in accordance with one embodiment of the present invention.
Figure 6:
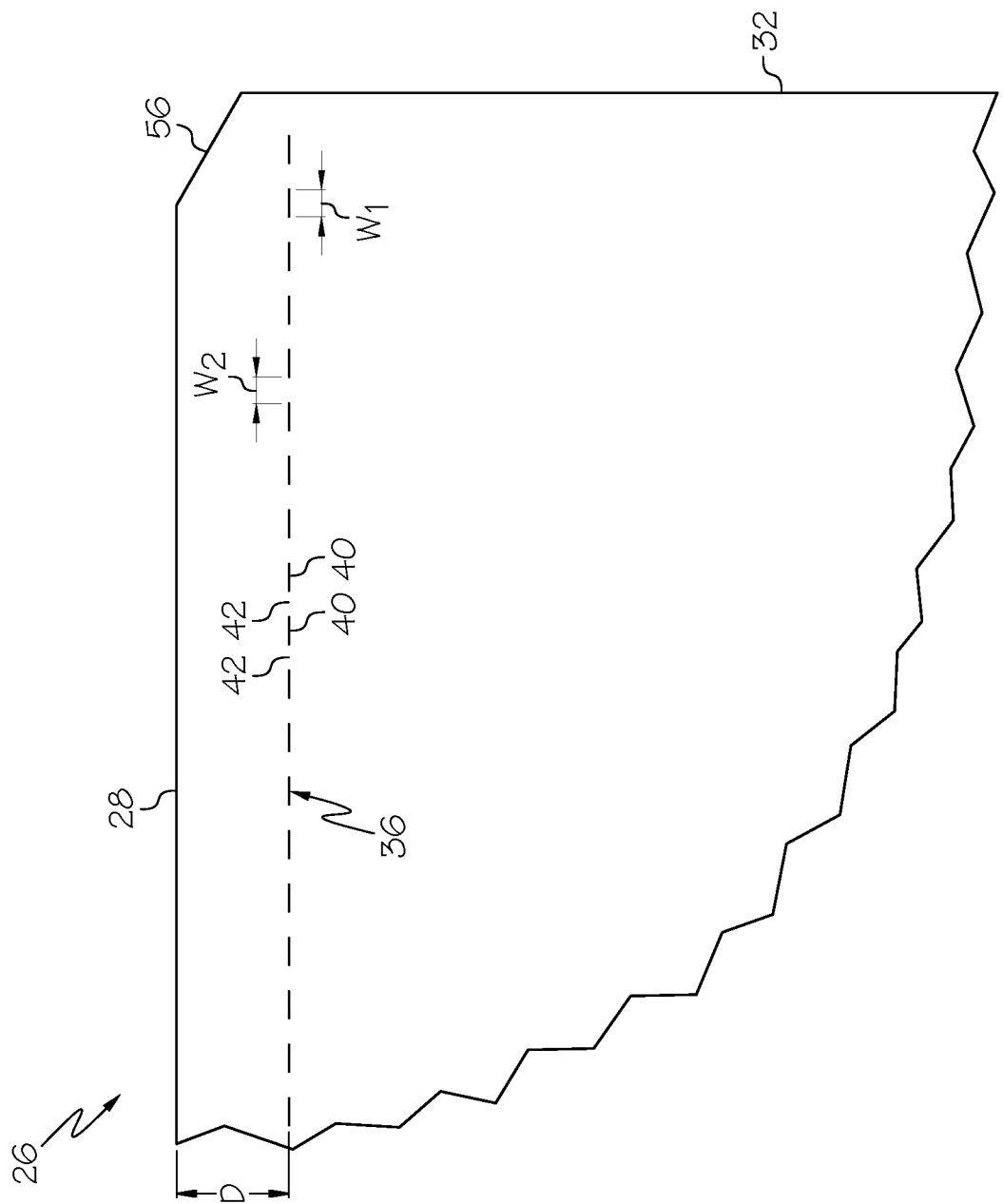
FIG. 6 is an enlarged plan view of a portion of the blank of FIG. 5.
Figure 7:
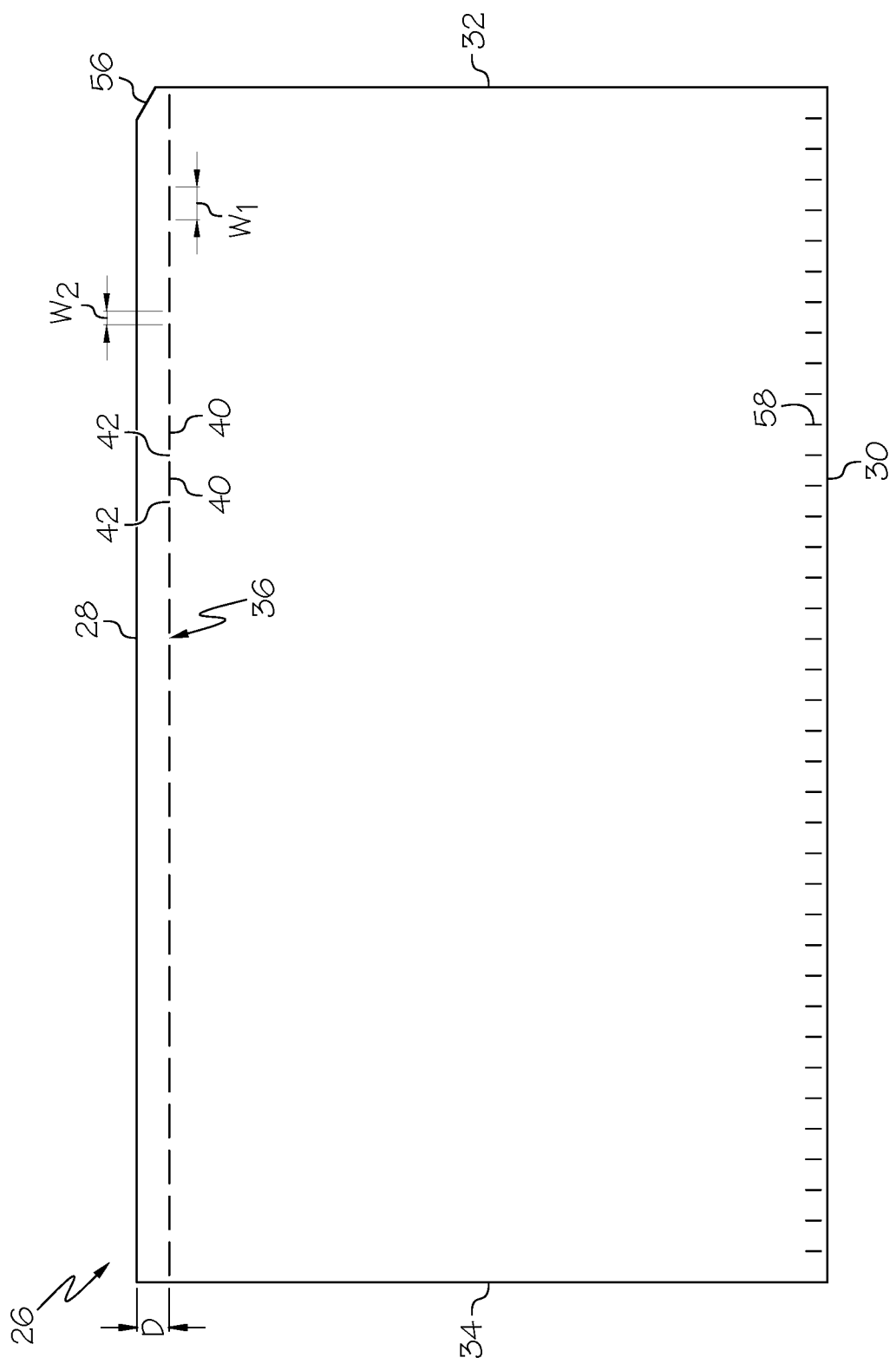
FIG. 7 is a plan view of a blank used to form the sidewall and upper lip of a plastic container in accordance with another embodiment of the present invention.

As demonstrated in FIGS. 5-7, the sidewall 18 can be formed from a single blank 26 or flat sheet of material. The blank 26 may be constructed entirely and exclusively of plastic material. In other words, the blank's 26 entire thickness is formed of plastic material. The blank 26 may be wrapped such that its marginal edge portions are brought together in overlapping fashion to form a side seam 44. The overlapping marginal edge portions forming the side seam 44 may be adhesively-sealed or heat-sealed through the application of heat and pressure or by adhesive, sonic weld, ultrasonic weld, sealants or the like.

The sheet or blank 26 has a top edge 28, a bottom edge 30, and side edges 32 and 34, all of which may be unfinished edges. The blank 26 is generally in the form of a square, rectangle or arc, which may be cut from a larger sheet or roll of material using a standard, commonly-known die cutting process or other suitable process now known or hereafter developed. The material thickness of the blank 26 may be between about 0.010" and about 0.025", although it will be appreciated that other thicknesses are within the scope of the present invention. In one embodiment, the sidewall 18 is approximately 0.016" thick.

As illustrated in FIGS. 5-7, the blank 26 includes a perforated line 36 proximate the top edge 28 of the blank 26. As discussed in further detail below, the perforated line 36 facilitates the curling, rolling, folding or bending of lip 38. The perforated line 36 is spaced a specified distance D below the top edge 28 and can run the full width of the blank 26. The portion of the blank 26 located above the perforated line 36 is curled, rolled, folded or bent downwardly to form the lip 38. Once the lip 38 is formed, the perforated line 36 results in the formation of, and is located proximate to, the top edge 52 of the container's mouth 20. Additionally, when the lip 38 is formed, the top edge 28 of the blank 26 becomes the lower edge 54 of the lip 38.

Figure 4B:
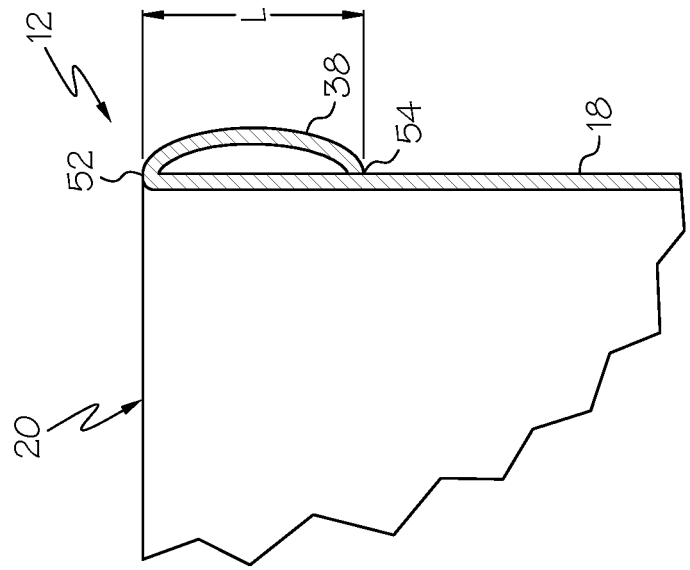
FIG. 4B is an enlarged partial sectional view of an upper curled lip of a plastic container in accordance with another embodiment of the present invention.
Figure 4A:
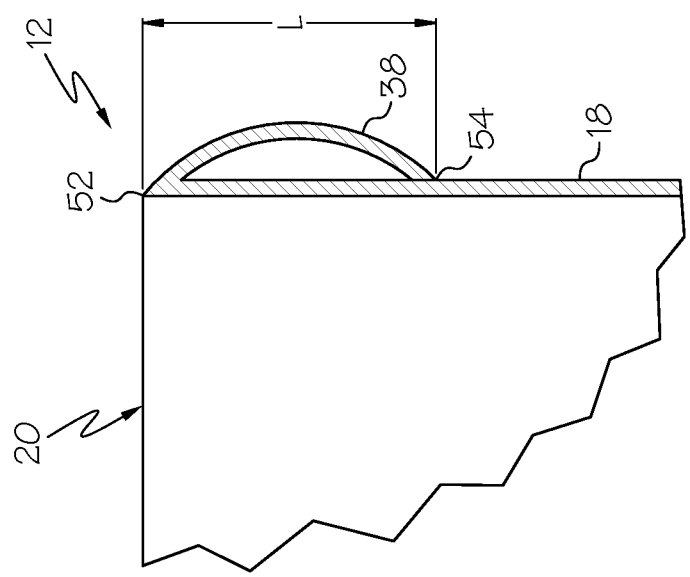
FIG. 4A is an enlarged partial sectional view of an upper curled lip of a plastic container in accordance with one embodiment of the present invention.

The amount of space or distance D between the top edge 28 of the blank 26 and the perforated line 36 dictates the size, or downwardly extending length L, of the lip 38. In one embodiment, the distance D between the perforated line 36 and the top edge 28 of the blank 26 may be approximately 0.25", thereby resulting in a lip 38 having a length L of a slightly smaller dimension (e.g., approximately 0.23") due to the outward arc or bow in the lip 38, as best illustrated in FIGS. 4A and 4B. In other embodiments, the distance D between the perforated line 36 and the top edge 28 of the blank 26 may be such that the length of the lip 38 is between about 0.15" and 0.5". However, it will be appreciated that the distance D between the perforated line 36 and the top edge 28 of the blank 26, may be substantially less than or greater than these dimensions, depending upon the desired length L of the lip 38.

As best shown in FIG. 6, the perforated line 36 consists of a plurality of spaced-apart perforations or slits 40. The perforated line 36 may be a predetermined slitting pattern comprising a series of regularly-spaced, repeating linear slits 40, as further illustrated in FIGS. 1 and 3. As shown, the slits 40 may each extend generally parallel to the top edge 28 of the blank 26. However, it will be appreciated that some or all of the slits 40 may be oriented and extending in directions other than parallel with the top edge 28. The slits 40 result in portions of uncut material (or skips) 42 located therebetween. The slits 40 and skips 42 may each have a width $W_1$ and $W_2$, respectively. In one embodiment the width $W_1$ of each slit 40 is between about 0.016" and about 0.25", while it will be appreciated that, in other embodiments, the width $W_1$ of each slit 40 may be greater or smaller. In another embodiment, the width $W_1$ of each slit 40 is approximately 0.063". The slits 40 in a single embodiment may be of uniform or variable width $W_1$. The width $W_2$ of each skip 42 may be similar to the width $W_1$ of each slit 40. However, as demonstrated in FIG. 7, it will be appreciated that width $W_2$ of each skip 42 may less than or greater than the width $W_1$ of each slit 40. It will be appreciated that the widths $W_1$ and $W_2$ of the slits 40 and skips 42 can impact the shape, radius and size of the curled lip 38, as well as the amount of force required for forming the lip 38. The slits 40 may be die cut, stamped, punched, rolled or otherwise formed into the blank 26 using any suitable process now known or hereafter developed.

It will also be understood that the slits 40 and skips 42 making up the perforated line 36 need not be consistent across the entire width of the blank 26. For example, the slits 40 may be wider and the skips 42 may be narrower in the regions adjacent the side edges 32 and 34 of the blank 26. Such wider slits 40 and narrower skips 42, as discussed in more detail below, can further reduce the amount of force required to curl, roll, fold or bend the lip 38 in the region of a double wall thickness 46 created by the overlapping side seam 44. It will also be appreciated that the slits 40 may also or alternatively be thicker in these regions in order to reduce the force required in the region of double thickness 46.

Figure 3:
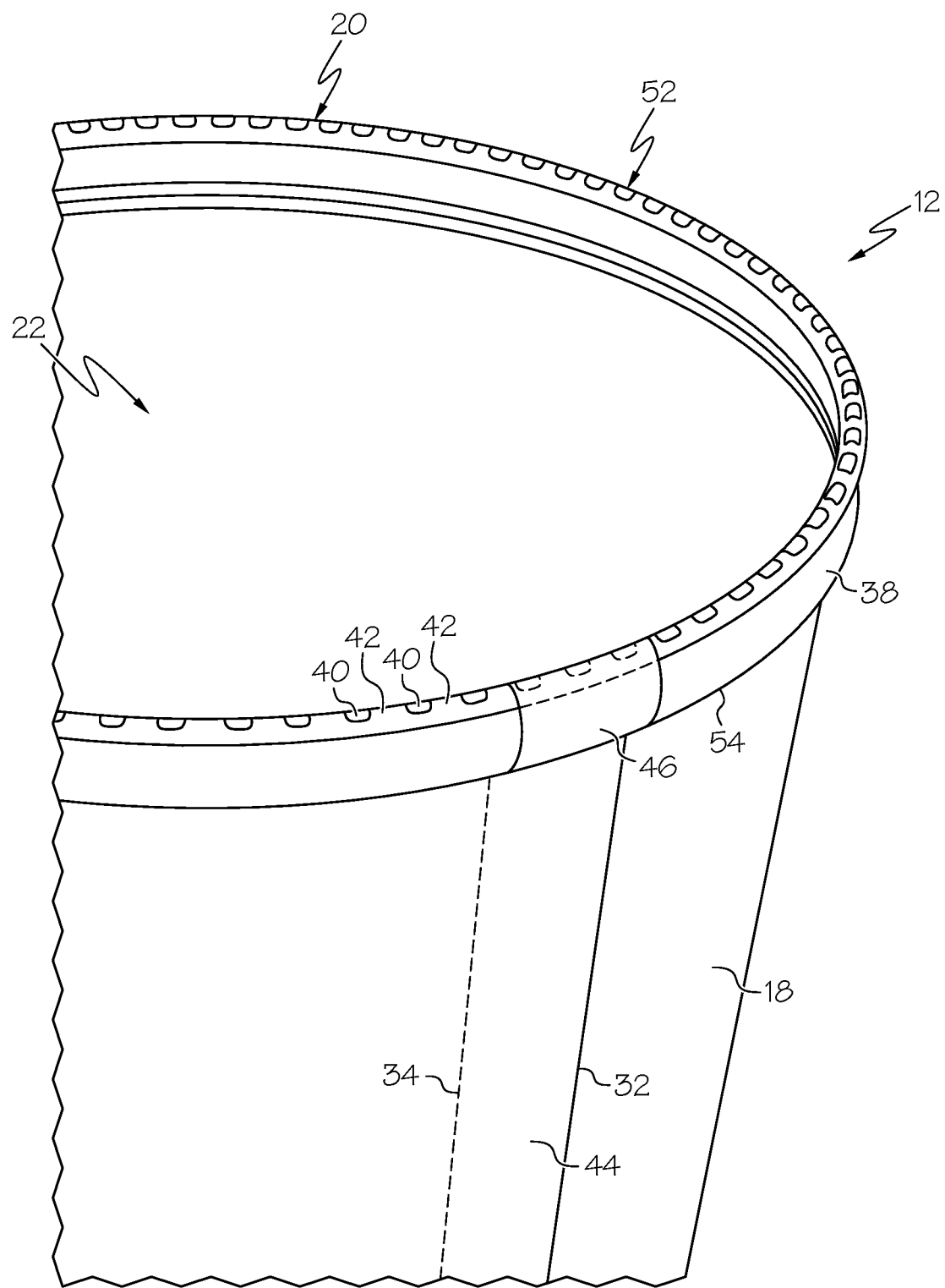
FIG. 3 is an enlarged side perspective view of the plastic container of FIG. 1 illustrating its upper curled lip and side seam.

As depicted in FIGS. 5-7, a notch 56 may be cut from the blank 26 at a corner where the top edge 28 and one of the side edges 32 or 34 intersect. As set forth above, in the embodiment where the sidewall is constructed of a wrapped blank 26 of material, the lip 38 has a double thickness in the region 46 created by the overlapping side seam 44. As shown in FIG. 3, the notch 56 becomes curled under when the lip 38 is formed, thereby reducing any excess bulge created by the overlapping side seam 44 in region 46.

The blank 26, as illustrated in FIGS. 5 and 7, can include scores or partial cuts 58 proximate the bottom edge thereof. These partial cuts 58 are beneficial in creating the inwardly folded bottom edge portion 24 on which the bottom wall panel 16 may be supported. As shown, the cuts 58 may each extend generally perpendicular to the bottom edge 30 of the blank 26. However, it will be appreciated that some or all of the cuts 58 may be oriented and extending in directions other than perpendicular to the bottom edge 30. When the blank 26 is wrapped to form a tubular profile, the cuts 58 extend radially and are circumferentially spaced apart from one another around the inwardly folded bottom edge portion 24. In one embodiment, the cuts 58 do not extend through the entire thickness of plastic, but rather are just scores created therein. In another embodiment, the cuts 58 extend through the entire width of the plastic. As illustrated in FIGS. 5 and 7, in one embodiment, the cuts 58 do not extend clear to the bottom edge 30 of the blank 26, but rather are spaced upwardly therefrom. However, in other embodiments, the cuts extend clear through the bottom edge 30.

Turning to the manufacturing process, the blank 26 and bottom wall panel 16 are respectively cut from sheets or rolls of material using a standard, commonly-known die cutting process or other suitable processes now known or hereafter developed. Slits 40 may be formed into the blank 26 simultaneously with, in advance of, or subsequent to the cutting of the blank 26.

In alternative embodiments, the sidewall 18 may be formed by extrusion, injection molding, thermoforming or other suitable processes now known or hereafter developed. In such processes, the sidewall 18 may, if desired, be initially formed as having a cylindrical or tubular profile and need not be wrapped, as is the case when the sidewall 18 is formed from a flat blank 26. In these embodiments, after the sidewall 18 is created, the perforated line 36, including the slits 40 can be formed therein. Likewise, the cuts 58 may also be formed after creation of the sidewall 18 in these embodiments as well.

Upon the slits 40 being framed in the blank 26, the top end of the blank 26 is curled, rolled, folded or bent downwardly to form the lip 38. The step of forming the lip 38 may occur either before or after the step of wrapping the blank 26 to form the sidewall 18. In one embodiment, the lip 38 is created after the blank 26 has been wrapped and the side seam 44 has been formed. In this instance, the outward curling, rolling, folding or bending of the lip 38 may be facilitated through the use of a die head (not shown). For example, the die head may be similar in nature to that shown in U.S. Pat. No. 8,424,275 for a "Sealed Plastic Closure and Method for Making the Same" to Wayne F. Schneider. One embodiment of the die head is adapted for rolling the lip 38 outwardly, while another embodiment of the die head is adapted for rolling the lip 38 inwardly.

As depicted in FIG. 3 and discussed above, the lip 38 has a double thickness in the region 46 created by the overlapping side seam 44. This thickened region 46 results in an area that is relatively stiffer and requires an increased amount of force, as compared to the remainder of the lip 38, for curling, rolling, folding or bending of the lip 38. However, the perforated line 36, which passes through this thickened region 46, as well as passes through the remainder of the sidewall 18; reduces the amount of force required in the step of forming the lip 38. Not only does the perforated line 36 reduce the amount of force required for curling, rolling, folding or bending of the overlapped region 46 of the lip 38, it also reduces the force required with respect to the remainder of the lip 38, albeit not necessarily by the same magnitude. Therefore, the perforated line 36 acts as an "equalizer" per se. The differential between the amount of force required for forming the lip 38 in the thickened region 46 as compared to the other regions of the lip 38 is reduced. In other words, the amount of force required for forming the lip 38 in the thickened region 46 is more akin to the amount of force required for forming the lip 38 in the other regions, due to the perforated line 36, as opposed to being significantly higher, which would be the case absent the perforated line 36. Furthermore, as set forth above, the slits 40 can be wider and/or thicker and the skips 42 can be narrower in the regions adjacent the side edges 32 and 34 of the blank 26 in order to further reduce the amount of force required to curl, roll, fold or bend the lip 38 in the region of double thickness 46.

As mentioned above, the lip 38 can be formed through the use of a die head (not shown). The die head contacts the unfinished upper edge 28 of the sidewall 18 and then curls, rolls, folds and/or bends the top end of the sidewall 28 outwardly to form the lip 38. In an alternative embodiment, the lip 38 may be curled, rolled, folded and/or bent inwardly, toward to the chamber 22 of the can 12, as opposed to outwardly. It will be appreciated that other methods for fouling the lip 38, including those now known or hereafter developed, may alternatively be utilized. In any instance, because less force is required for forming the lip 38, the amount of heat (for softening that material) and/or mineral oil (for lubricating the interface between the sidewall 18 and the die head) necessary during the forming of the lip 38 can be significantly reduced or even eliminated. As such, the cans 12 can be handled directly after the lip 38 is formed, as the amount of residual heat remaining therein is minimal in comparison with the prior art. Additionally, the cans 12 are not coated with excess mineral oil.

The bottom wall panel 16 is fastened to the sidewall 18 either prior to or subsequent to the forming of the lip 38. The lid 14 can be added once product (not shown) is placed within the chamber 22.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of manufacturing a container, said method comprising the steps of:
   providing a blank of material having a top edge and opposing side edges;
   forming a perforated line having slits at a specified distance below said top edge of said blank, wherein said perforated line extends the full width of the blank;
   wrapping said blank to form a container body, said container body having top and bottom edges; and
   curling, rolling, folding or bending a top portion of said container body outwardly and downwardly to form a lip that circumscribes a top portion of said container body.

2. The method of claim 1,
   wherein when said blank is wrapped, said marginal edge portions are brought together in overlapping fashion to form a side seam.

3. The method of claim 1, wherein said perforated line is formed into said blank prior to said blank being wrapped.

4. The method of claim 1, wherein when said lip is formed, said container body top edge becomes a lower edge of said lip.

5. The method of claim 1, wherein when said lip is formed, said container body defines an upwardly opening mouth having a mouth top edge and wherein said slits of said perforated line are defined proximate said mouth top edge.

6. The method of claim 1, wherein said slits are wider in regions adjacent said side edges of said blank.

7. The method of claim 1, wherein skips of uncut material are defined between said slits, and wherein said slits are wider than said skips in regions adjacent said side edges of said blank.

8. The method of claim 1, wherein said slits are thicker in regions adjacent said side edges of said blank.

9. A method of manufacturing a container, said method comprising the steps of:
   providing a blank of material having a top edge and opposing side edges;
   forming a perforated line having slits at a specified distance below said top edge of said blank;
   wrapping said blank to form a container body; and
   curling, rolling, folding or bending a top portion of said container body downwardly to form a lip that circumscribes said container body;
   wherein said slits are wider in regions adjacent said side edges of said blank.

10. The method of claim 9, wherein skips of uncut material are defined between said slits, and wherein said slits are wider than said skips in regions adjacent said side edges of said blank.

11. The method of claim 9, wherein said slits are thicker in regions adjacent said side edges of said blank.

12. The method of claim 9, wherein when said lip is formed, said container body defines an upwardly opening mouth having a mouth top edge and wherein said slits of said perforated line are defined proximate said mouth top edge.

13. A method of manufacturing a container, said method comprising the steps of:
   providing a plastic container body, said container body having top and bottom edges;
   forming a perforated line having slits at a specified distance below said container body top edge; and
   curling, rolling, folding or bending a top portion of said container body outwardly and downwardly to form a lip that circumscribes a top portion of said container body;
   wherein when said lip is formed, said container body defines an upwardly opening mouth having a mouth top edge and wherein said slits of said perforated line define said mouth top edge of said lip.

* * * * *